United States Patent
Chen et al.

(10) Patent No.: US 7,558,576 B2
(45) Date of Patent: Jul. 7, 2009

(54) EMPLOYING FREQUENCY OFFSET TO COMPENSATE FOR DOPPLER SHIFT

(75) Inventors: Pei Chen, San Diego, CA (US); Ivan Jesus Fernandez-Corbaton, Nuremberg (DE)

(73) Assignee: Qualcomm Incorporated, San Diego, CA (US)

( * ) Notice: Subject to any disclaimer, the term of this patent is extended or adjusted under 35 U.S.C. 154(b) by 686 days.

(21) Appl. No.: 11/231,395

(22) Filed: Sep. 20, 2005

(65) Prior Publication Data

US 2006/0223559 A1  Oct. 5, 2006

Related U.S. Application Data

(60) Provisional application No. 60/666,332, filed on Mar. 29, 2005.

(51) Int. Cl.
*H04W 36/32* (2006.01)
*H04B 1/12* (2006.01)

(52) U.S. Cl. ............... 455/441; 455/504; 455/63.1; 455/67.16; 455/230

(58) Field of Classification Search .............. None
See application file for complete search history.

(56) References Cited

U.S. PATENT DOCUMENTS 5,551,059 A    8/1996   Hutcheson et al.
5,640,166 A *  6/1997   Siwiak ............... 455/12.1 X
7,042,858 B1 * 5/2006   Ma et al. ............ 370/331
7,315,588 B2 * 1/2008   Hessel .............. 375/340
2003/0099215 A1 5/2003  O'Shea

FOREIGN PATENT DOCUMENTS

EP    1239615 A    11/2002

OTHER PUBLICATIONS

Austin M D et al: "Velocity Adaptive Handoff Algorithms for Microcellular Systems", IEEE Transactions on Vehicular Technology, IEEE Service Center, Piscataway, NJ, US, Aug. 1, 1994, pp. 549-561, p. 549, left-hand column, paragraph 1-p. 550, right-hand column, paragraph 2.

* cited by examiner

*Primary Examiner*—Philip J Sobutka
(74) *Attorney, Agent, or Firm*—Turocy & Watson, LLP

(57) ABSTRACT

At least one embodiment of the invention provides an automated frequency offset compensation method, system, and apparatus that improves throughput between one or more wireless communication devices by compensating for frequency offsets caused by a Doppler effect. In particular, one implementation estimates the frequency offset and uses this to compensate the carrier signal power to interference power ratio (C/I) when the transmitting and receiving devices are moving relative to each other such that a Doppler effect creates a frequency offset in the perceived frequency of the received carrier signal.

20 Claims, 9 Drawing Sheets

EMPLOYING FREQUENCY OFFSET TO COMPENSATE FOR DOPPLER SHIFT

CLAIM OF PRIORITY UNDER 35 U.S.C. §119

The present Application for Patent claims priority to Provisional Application No. 60/666,332 entitled "FORWARD LINK DOPPLER COMPENSATION IN C/I ESTIMATION" filed Mar. 29, 2005, and assigned to the assignee hereof and hereby expressly incorporated by reference herein.

BACKGROUND

1. Field

At least one feature relates to wireless communication systems, and more specifically, a scheme to reduce signal degradation by compensating for a Doppler frequency offset.

2. Background

Wireless communication systems are used for many applications including communicating between moving platforms to fixed locations. For example, an aircraft may have a wireless (e.g., radio frequency) link to a current base station. As the aircraft moves, it tracks one sector and monitors other sectors for better pilot/beacon signals to determine if another (e.g., closer, better signal strength) base station is available. If a pilot signal from another base station is detected, a communications handoff from the current base station to the candidate base station may be performed.

Because aircraft typically travel at high speeds, there may be a frequency offset differential, due to a Doppler effect, between the current sector and the candidate sector(s). For example, in a worse case scenario, if an aircraft is moving directly away from the current sector and directly toward an opposite candidate sector, and traveling at 340 meters per second (m/s), the frequency offset may be 1927 Hz with a carrier frequency of 850 MHz. This means that there is an underestimation of the true carrier signal power to interference signal power ratio (i.e., C/I power ratio) of the candidate pilot signal, because the estimator is off in frequency. This results in a lower throughput since a handoff may not be performed properly and thus the receiver is not communicating with the best sector or base station.

SUMMARY

One implementation provides a frequency compensation method comprising: (1) receiving a wireless carrier signal; (2) estimating a frequency offset for the carrier signal; and (3) estimating a received carrier signal power to interference signal power ratio (C/I) by using the frequency offset to compensate for Doppler shift between a receiver of the wireless carrier signal and a transmitter of the wireless carrier signal. The wireless carrier signal may be a pilot signal from a candidate base station with which a moving communication device that implements the frequency compensation method. The receiver may be a communication device mounted on an aircraft while the base station may be static.

Estimating the frequency offset may include (1) determining a cross product discriminator of the wireless carrier signal, and (2) determining a dot product discriminator of the wireless carrier signal. In one example, the frequency offset estimate is determined by the equation $$\Delta \hat{f} = \frac{\Delta f_{max}}{\tan(2\Delta f_{max} \pi m_1 NT_c)} \times \frac{CPD}{DPD},$$

where CPD is the result of a cross product discriminator and DPD is the result of a dot product discriminator of a pilot burst in the wireless carrier signal, $m_1$ and N are selected coefficients, $\Delta f_{max}$ is the maximum expected frequency offset and Tc is a symbol interval. The maximum frequency offset $\Delta f_{max}$ may be estimated by $\Delta f_{max} \approx (f_c \times v)/c$, where $f_c$ is the carrier frequency, v is the maximum speed difference between the receiver of the wireless carrier signal and the transmitter of the wireless carrier signal, and c is the speed of light. C/I may be determined by the equation $$C/I = \frac{K \left| \sum_{k=0}^{K-1} \hat{y}'_k y^*_k \right|^2}{\sum_{k=0}^{K-1} |\hat{y}'_k|^2 \left| \sum_{k=0}^{K-1} e^{j\theta_k} \right|^2 - K \left| \sum_{k=0}^{K-1} \hat{y}'_k y^*_k \right|^2},$$

where received pilot symbols in the carrier signal are defined as $\hat{y}_k = \alpha e^{j\theta_k} y_k + n_k$, $0 \leq k \leq$ total number of pilot chips (K), $\theta_k = 2\pi \Delta f k T_c$, $T_c$ is the time interval between two consecutive pilot symbols $y_k$, $n_k$ is the additive white Gaussian noise (AWGN) at time k, and $\alpha$ is channel attenuation.

One implementation may provide a processor having (1) an input interface to couple an antenna and receive a carrier signal; (2) a circuit coupled to the input interface to receive the carrier signal and configured to (a) estimate a frequency offset for the carrier signal, and (b) determine a carrier signal power to interference signal power ratio (C/I) by using the frequency offset to compensate for Doppler shift. The carrier signal may be a pilot signal from a candidate base station and is a relative motion between a receiver of the pilot signal and the candidate base station. The circuit may be further configured to retrieve a pre-calculated offset value from a look-up table to determine C/I.

In one implementation, the processor, system, or method may also (1) search for candidate base stations; (2) switch from a current base station to a candidate base station, if a better link can be established with the candidate base station than is available with the current base station. The candidate base station is selected based on its C/I. Pilot signals (e.g., pilot bursts) are transmitted by the candidate base stations and used to determine the base station with the best C/I. The C/I for candidate base stations is corrected for frequency offsets prior to selecting a candidate base station.

On implementation also provides a wireless communication device comprising: (1) an input interface coupled to an antenna to receive a wireless signal; and (2) a signal processor configured to (a) receive the wireless signal from the input interface, (b) estimate a frequency offset for the wireless signal, and (c) determine a received carrier signal power to interference signal power ratio (C/I) by using the frequency offset to compensate for Doppler shift. A memory device may be coupled to the signal processor to store a lookup table of predetermined frequency offset correction values to determine C/I.

Yet another embodiment provides a machine-readable medium having one or more instructions for compensating for a frequency offset when a receiver selects between candidate base stations, which when executed by a processor causes the processor to: (a) receive one or more pilot signals from one or more candidate base stations; (b) estimate a frequency offset for the one or more pilot signals; (c) estimate a received carrier signal power to interference signal power ratio (C/I) by using the frequency offset to compensate for Doppler shift between the receiver and the one or more candidate base stations; (d) select the candidate base station from the one or more candidate base stations based on their corresponding C/I; and (e) switch from a current base station to a candidate base station, if a better communication link can be established with the candidate base station than is available with the current base station.

DETAILED DESCRIPTION

Figure 1:
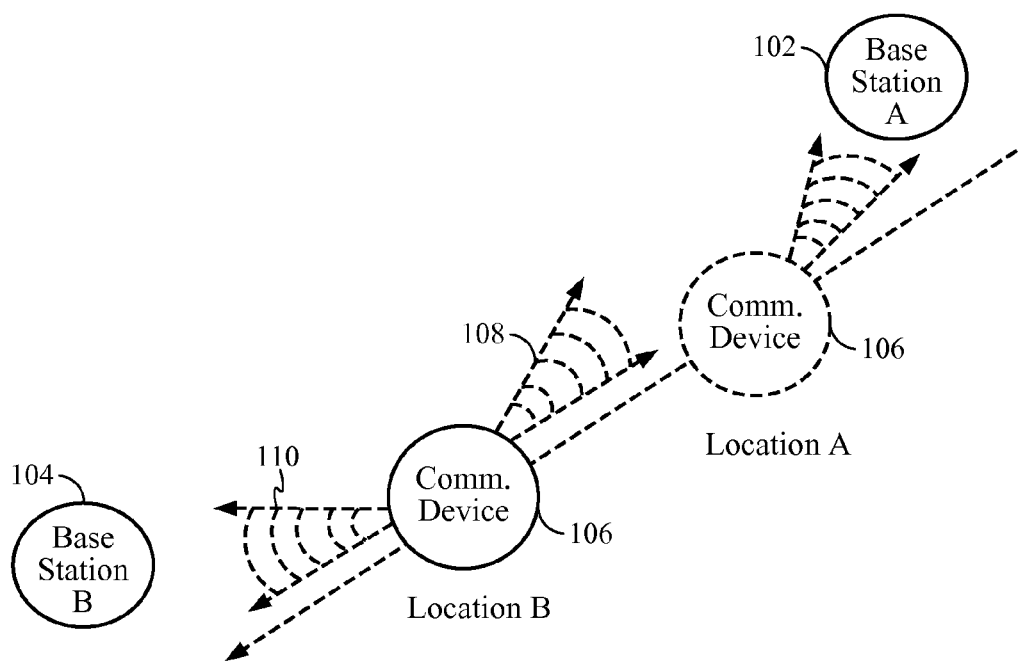
FIG. 1 illustrates a system in which the present invention may be implemented to compensate for a Doppler shift when switching communications from a current base station to a new base station.

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to, portable or fixed storage devices or optical storage devices capable of storing or containing instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

One feature provides a system, method, and apparatus that may improve throughput between one or more wireless communication devices by compensating for frequency offsets caused by a Doppler effect. In particular, one implementation accurately estimates the carrier signal power to interference power ratio (C/I) when a Doppler effect creates a frequency offset in the perceived frequency of the received carrier signal.

FIG. 1 illustrates a system in which the present invention may be implemented to compensate for a Doppler shift when switching communications from a current base station 102 to a new base station 104. Communication device 106 may be coupled to a moving platform (e.g., aircraft, etc.) and moves from a first location A to a second location B. Communication device 106 may communicate wirelessly with current base station 102 which may be static or moving. A base station (e.g., base stations A or B) may serve as a bridge, relay, or access point for communication device 106 to communicate with wired or wireless networks. Communication device 106 periodically, continuously, sporadically, and/or as needed, searches for pilot or beacon signals from other base stations. The pilot or beacon signals serve to notify a receiver of the presence of other base stations with which to communicate. This enables communication device 106 to switch its communication link 108 from a currently used base station 102 to a new base station 104. As communication device 106 detects new base station 104 and determines that it has greater signal strength than current base station 102, it switches the current beam 108, directed to the current base station 102, to a new beam 110, directed to the new base station. The signal strength from current base station 102 and new base station 104 may be ascertained from pilot signals emitted by the base stations. In this manner, communication device 106 initiates a communication handoff to new base station 104.

In the process of detecting and establishing communications with new base station 104, communication device 106 may ascertain the carrier frequency of the pilot signal, or other signals, from new base station 104 to lock into the signal. However, since communication device 106 is moving toward new base station 104, a Doppler shift or offset in frequency may occur. That is, as communication device 106 switches from communicating with current base station 102 to new base station 104, it has to compensate for the Doppler frequency offset caused by moving away from current base station 102 to moving toward new base station 104. The magnitude of the frequency offset is dependent on the speed with which communication device 106 moves relative to the base station with which it communicates. A miscalculation in this frequency offset leads to a degradation in the received signal at communication device 106.

One feature provides a method of determining a frequency offset at communication device 106 to improve the received carrier signal power to interference signal power (C/I). Analytical and simulation results show that a severe underestimation of the C/I of the candidate pilot signal happens in the high C/I region. Thus, one implementation provides an algorithm that estimates the frequency offset and compensates the C/I estimation using the estimated Doppler frequency. This algorithm may be implemented in a digital signal processor (DSP) at a receiving device.

Figure 6:
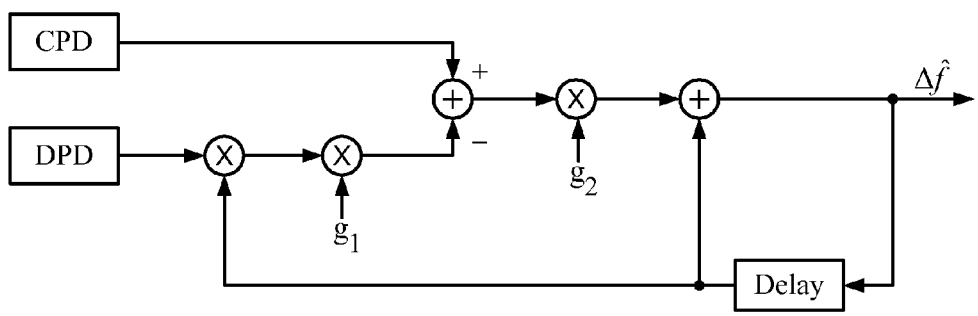
FIG. 6 is a block diagram illustrating a virtual rotator loop (VRL) that may be implemented to estimate a frequency offset.

The received signal for a transmitted pilot symbol $y_k$ (e.g., bytes, bits, numbers, etc.) at time k in a lossless environment may be defined as $y_k=1$, for $0 \leq k \leq 95$, for instance. However, in environments having an additive white Gaussian noise (AWGN) $n_k$ at time k, and channel attenuation $\alpha$, the C/I would be lower. In such environments, the received pilot symbols may be defined as $$\hat{y}_k = \alpha y_k + n_k, \text{ where } 0 \cdot k \cdot 95 \quad \text{(Equation 1)}$$

where there are 96 burst pilot chips (see FIG. 6). This number may change depending on the implementation.

The C/I estimate may be defined as $$|\alpha|^2/\sigma^2, \text{ where } \sigma^2 \text{ is the noise power,}$$

and can be obtained from $\hat{y}$. The Maximum Likelihood (ML) estimate of channel attenuation $\alpha$ is given by $$\frac{1}{K}\sum_{k=0}^{K-1} \hat{y}_k y_k^*,$$

where * denotes the complex conjugate and the ML estimate of $\sigma^2$ is given by $$\frac{1}{K}\sum_{k=0}^{K-1}|\hat{y}_k|^2 - \frac{1}{K^2}\left|\sum_{k=0}^{K-1}\hat{y}_k y_k^*\right|^2,$$

where K=96 (the number of burst pilot chips).

Thus the estimate of C/I can be obtained as $$\left(\frac{\hat{C}}{I}\right) = \frac{\left|\sum_{k=0}^{K-1}\hat{y}_k y_k^*\right|^2}{K\sum_{k=0}^{K-1}|\hat{y}_k|^2 - \left|\sum_{k=0}^{K-1}\hat{y}_k y_k^*\right|^2}. \quad \text{(Equation 2)}$$

Figure 2:
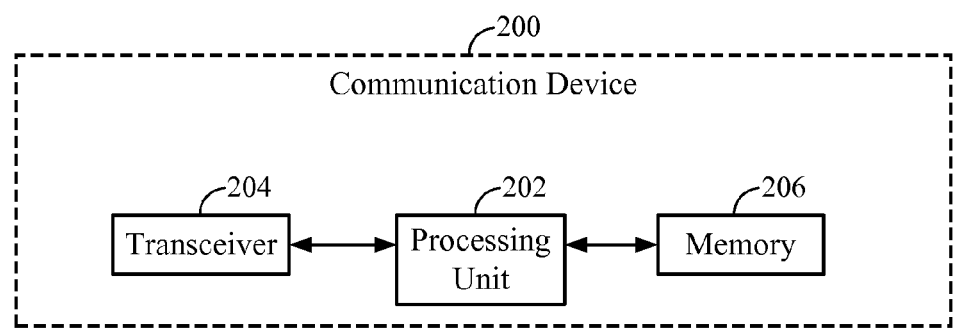
FIG. 2 is a block diagram illustrating a communication device that may be employed according to one embodiment of the invention.

FIG. 2 is a block diagram illustrating a communication device 200 that may be employed according to one embodiment of the invention. Communication device 200 includes a processing unit 202 coupled to a transceiver 204 and, optionally, may also include a memory unit 206. The processing unit 202 may be configured to receive a carrier signal and estimate the carrier signal power to interference power ratio (C/I) when a Doppler effect creates a frequency offset in the perceived frequency of the received carrier signal. The processing unit 202 may receive and/or transmit through transceiver 204 and may store and/or retrieve information from memory 206. Various embodiments of the communication device 200 may be implemented with more or less components performing functions equivalent to those described herein.

Figure 3:
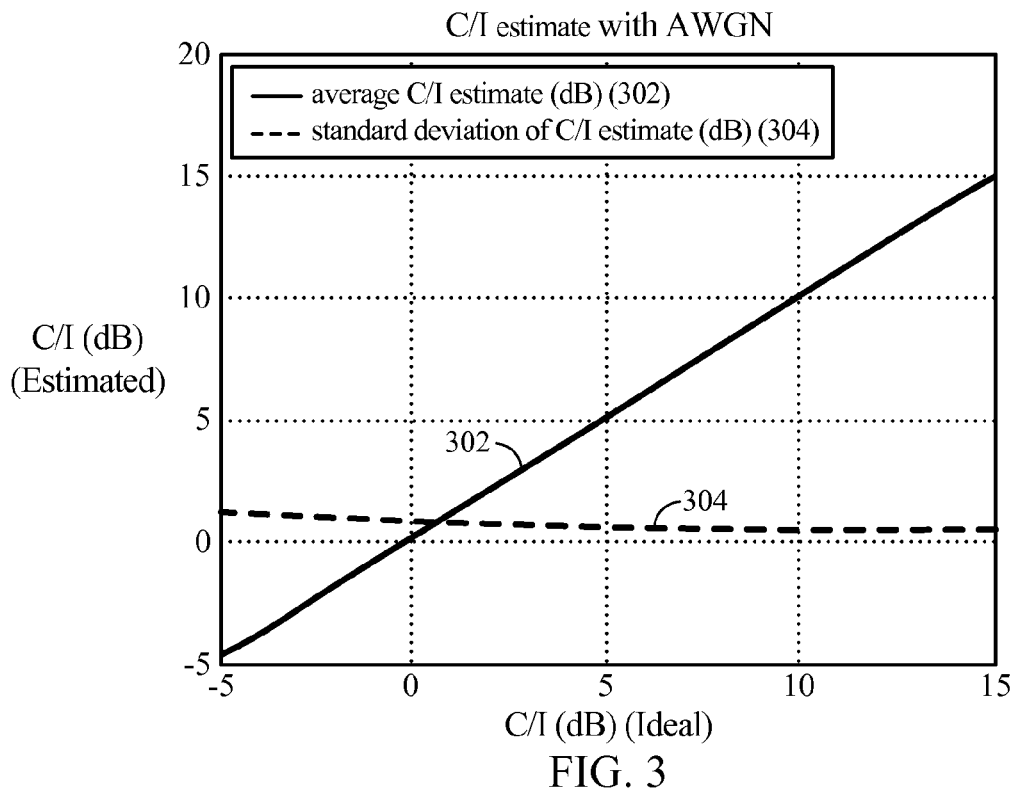
FIG. 3 illustrates a graph of simulations performed for an Additive White Gaussian Noise (AWGN) channel for an ideal signal power to interference power ratio (C/I) from −5 dB to 15 dB.

FIG. 3 illustrates a graph of simulations performed for an additive white Gaussian noise (AWGN) channel for an ideal C/I from −5 dB to 15 dB. This graph illustrates the C/I obtained where no Doppler frequency offset is present. The results shown were obtained by averaging 1000 simulations. Line 302 is a plot of the ideal C/I versus the estimated C/I. Since this simulation assumes ideal circumstances, the ideal and estimated C/Is have the same value, thus resulting in the ideal line 302 with no degradation of C/I. Line 304 similarly illustrates that the standard deviation of the estimated C/I is minimal.

In one implementation, a mobile device (e.g., communication device 106) tracks one sector (e.g., using beam 108) to communicate with a current base station (e.g., base station 102) and monitors other sectors (e.g., using beam 110) for handoff to other base stations (e.g., candidate base station 104). However, there could be a frequency offset $\Delta f$ due to a Doppler shift when detecting the pilot signal from a non-serving sector (e.g. through beam 110). If this frequency offset is not accounted for, then the mobile device cannot accurately estimate C/I of non-serving sectors and degrades it throughput as a result of not being able to perform handoff properly.

The received pilot symbols $\hat{y}_k'$ from the non-serving sector (e.g., through beam 110) can be written as $$\hat{y}_k' = \alpha e^{j2\pi \Delta f k T_c} y_k + n_k', \text{ where } 0 \cdot k \cdot 95, \quad \text{(Equation 3)}$$

where $T_c$ is the time interval (for example, 1/1.2288 µseconds) between two consecutive pilot symbols $y_k$. By redefining the received pilot symbols $\hat{y}_k'$ in this manner, Equation 2 becomes $$\left(\frac{\hat{C}}{I}\right)' = \frac{\left|\sum_{k=0}^{K-1}\hat{y}_k' y_k^*\right|^2}{K\sum_{k=0}^{K-1}|\hat{y}_k'|^2 - \left|\sum_{k=0}^{K-1}\hat{y}_k' y_k^*\right|^2}, \quad \text{(Equation 4)}$$

which represents the C/I estimate with frequency offset for a candidate sector.

From Equation 1 through Equation 4, it can now be shown that $$\left(\frac{\hat{C}}{I}\right)' = \frac{\left|\sum_{k=0}^{K-1} e^{j\theta_k}\right|^2}{K^2 + \left(K^2 - \left|\sum_{k=0}^{K-1} e^{j\theta_k}\right|^2\right)\left(\frac{\hat{C}}{I}\right)} \left(\frac{\hat{C}}{I}\right),$$ (Equation 5)

where $\theta_k = 2\pi\Delta fkT_c$. Equation 5 gives the degradation of the estimated C/I due to frequency offset $\Delta f$.

Figure 4:
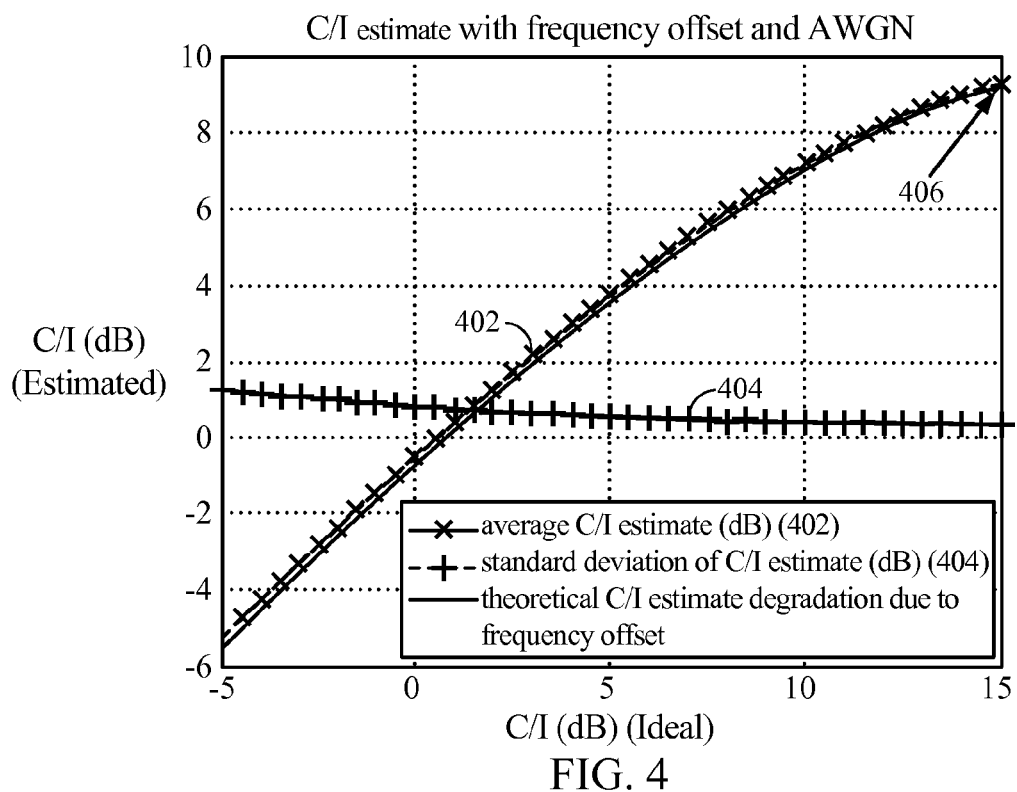
FIG. 4 illustrates a graph of simulations performed for an ideal C/I from −5 dB to 15 dB with frequency offset $\Delta f$=2000 Hz and no Doppler compensation.

FIG. 4 illustrates a graph of simulations performed for a true C/I from −5 dB to 15 dB with frequency offset $\Delta f$=2000 Hz and no Doppler compensation. This theoretical result 402 is obtained according to Equation 5, and the simulation result is averaged over 1000 simulations. Note that the standard deviation 404 is not significantly changed from the standard deviation 304 (FIG. 3). The plot line 402 shows an underestimation of about 6 dB for a C/I of 15 dB (point 406). That is, instead of being 15 dB at point 306 the estimated C/I is about 9 dB. This severe underestimation of C/I in the high C/I region is due to the frequency offset $\Delta f$=2000 Hz that may be caused by a Doppler shift. An algorithm that more accurately compensates for this frequency offset $\Delta f$ is needed to more accurately determine C/I.

This degradation of the C/I estimate can be compensated if the frequency offset $\Delta f$ is known. When the frequency offset is known, the degradation of the C/I estimate can be compensated by changing Equation 4 into the following $$\left(\frac{\hat{C}}{I}\right)' = \frac{\left|\sum_{k=0}^{K-1} \hat{y}_k' y_k^*\right|^2 K^2 / \left|\sum_{k=0}^{K-1} e^{j\theta_k}\right|^2}{K\sum_{k=0}^{K-1} |\hat{y}_k'|^2 - \left|\sum_{k=0}^{K-1} \hat{y}_k' y_k^*\right|^2 K^2 / \left|\sum_{k=0}^{K-1} e^{j\theta_k}\right|^2} =$$ (Equation 6)

$$\frac{K\left|\sum_{k=0}^{K-1} \hat{y}_k' y_k^*\right|^2}{\sum_{k=0}^{K-1} |\hat{y}_k'|^2 \left|\sum_{k=0}^{K-1} e^{j\theta_k}\right|^2 - K\left|\sum_{k=0}^{K-1} \hat{y}_k' y_k^*\right|^2},$$

Figure 5:
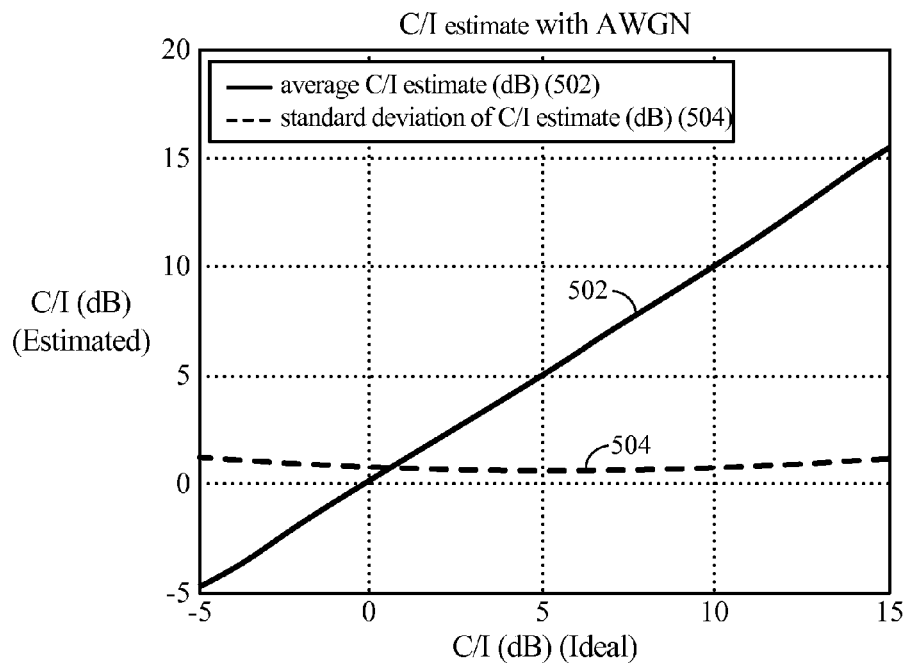
FIG. 5 is a graph illustrating simulation results of C/I estimates based on Equation 6 for a known offset frequency $\Delta f$.

FIG. 5 is a graph illustrating simulation results of C/I estimates based on Equation 6 for a known offset frequency $\Delta f$. The frequency-offset $\Delta f$ is maintained at 2000 Hz (line 502), and this frequency offset value is used in estimating the C/I. The average C/I is obtained over 1000 simulations. As can be observed, the degradation (line 502) of the estimated C/I due to frequency offset is well compensated by Equation 6. Line 502 is a plot of the ideal C/I versus the estimated C/I and shows almost no degradation of C/I. That is, Equation 6 compensates for a frequency offset (e.g., $\Delta f$=2000 Hz) so that the estimated C/I at 15 dB approaches the true value.

While Equation 6 provides a way to improve the estimated C/I, it assumes that the frequency offset $\Delta f$ is known. In actual implementations, the frequency offset $\Delta f$ is typically not known.

FIG. 6 is a block diagram illustrating a virtual rotator loop (VRL) that may be implemented to estimate a frequency offset. The cross product discriminator (CPD) of in-phase and the imaginary parts of the received pilot bursts $y_k$ and the dot product discriminator (DPD) of the in-phase and the imaginary parts of the received pilot bursts $y_k$. The CPD and DPD can be written as Equation 7 and Equation 8, respectively.

$$CPD = \alpha^2 \sin(2\pi m_1 N \Delta fT_c) \frac{\sin^2(2\pi N \Delta fT_c)}{\sin^2(2\pi \Delta fT_c)} + \text{noise},$$ (Equation 7)

$$DPD = \alpha^2 \cos(2\pi m_1 N \Delta fT_c) \frac{\sin^2(2\pi N \Delta fT_c)}{\sin^2(2\pi \Delta fT_c)} + \text{noise},$$ (Equation 8)

where N is the length of the pilot signal burst and $m_1 N$ is the interval between the start of two pilot bursts that are used in computing CPD and DPD. Thus, if CPD and DPD are known, a $\Delta f$ can be derived from the Equations 7 and 8.

Figure 7:
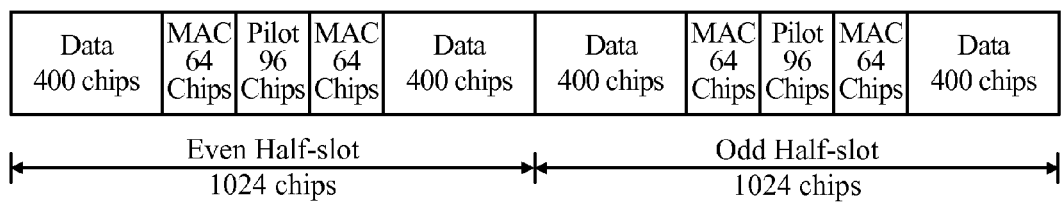
FIG. 7 illustrates a slot data structure of 2048 chips according to one implementation.

FIG. 7 illustrates a slot data structure of 2048 chips according to one implementation. The size of the slot structure and may be varied depending on the implementation. Each slot is divided into an even and an odd half-slot, and each half contains data, pilot burst, and MAC bits. There is one pilot burst of 96 chips every half-slot (1024 chips). Note that the chip interval is just the time interval between two consecutive samples.

Figure 8:
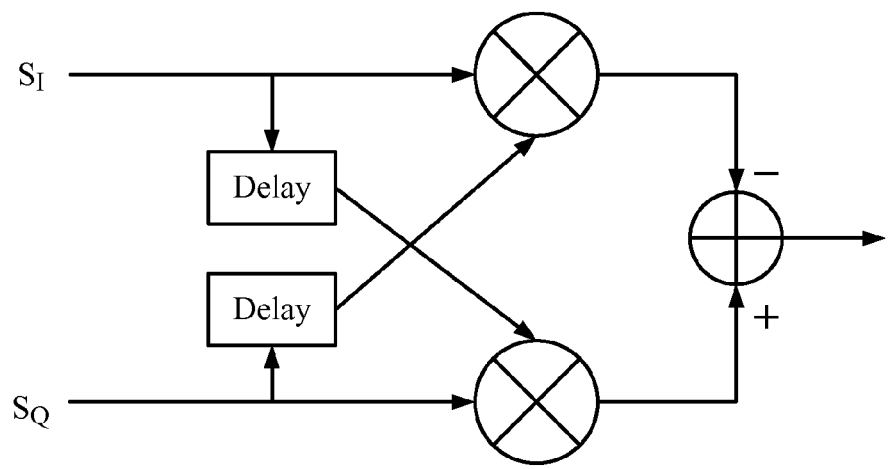
FIGS. 8 and 9 illustrate equivalent block diagrams showing how the cross product discriminator (CPD) of a signal may be determined.
Figure 9:
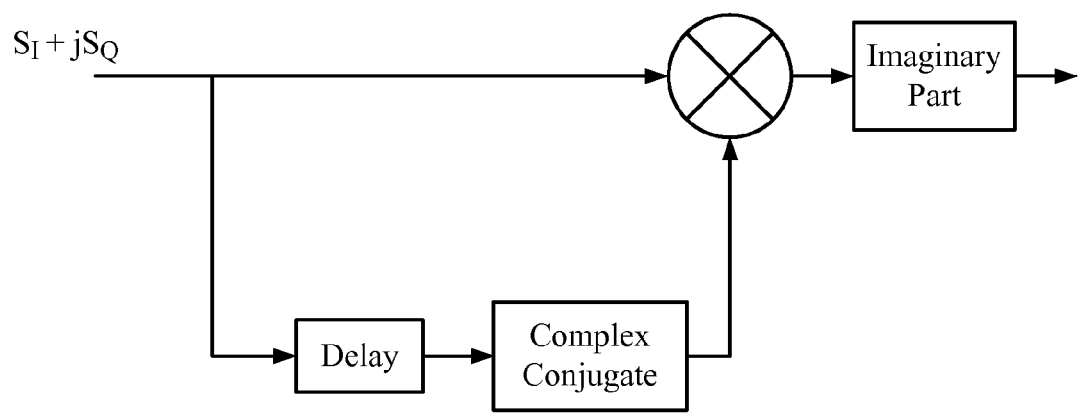
Figure 10:
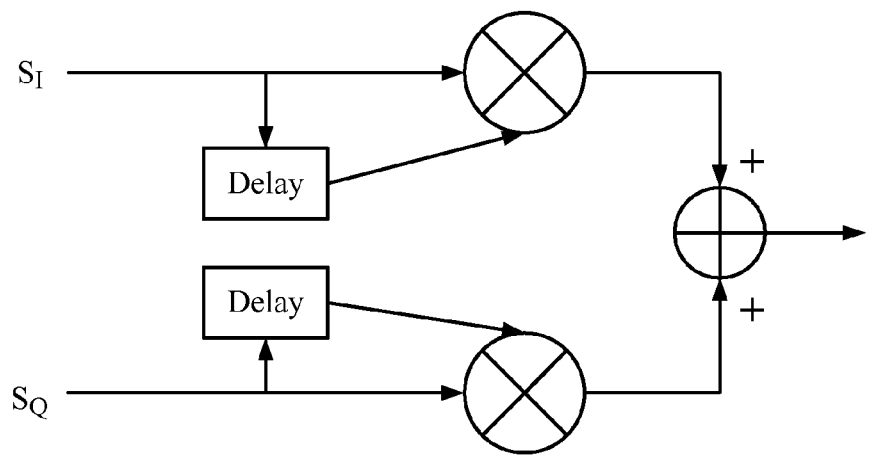
FIGS. 10 and 11 illustrate equivalent block diagrams showing how the dot product discriminator (DPD) of a signal may be determined.
Figure 11:
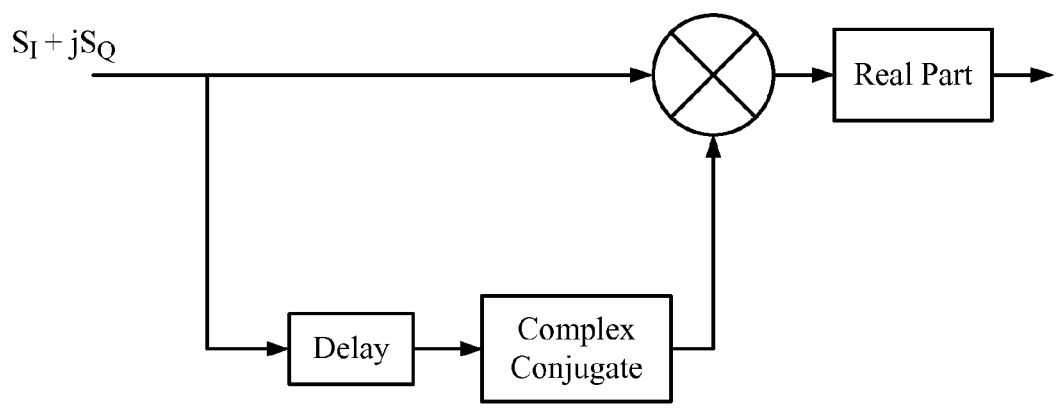

FIGS. 8 and 9 illustrate equivalent block diagrams showing how the cross product discriminator (CPD) of the in-phase and imaginary parts of a received signal (e.g., pilot burst) may be determined. Similarly, FIGS. 10 and 11 illustrate equivalent block diagrams showing how the dot product discriminator (DPD) of the in-phase and imaginary parts of a received a signal (e.g., pilot burst) may be determined. In these diagrams $S_I$ and $S_Q$ may be represented as $$S_I = \sum_{n=k}^{k+N-1} I[n]$$

$$S_Q = \sum_{n=k}^{k+N-1} Q[n]$$

where $I[n]+jQ[n]$ represents the received pilot symbol at time n and N is the length of the pilot burst (the same as N used in Equations 7 and 8). Thus, CPD and DPD can be obtained.

In one tracking mode example, the CPD and DPD are computed using full pilot bursts N=96 separated by $m_1 N$=1024 chips. In acquisition mode, the CPD and DPD are computed using a full pilot burst of 96 chips as two half pilot bursts of 48 chips, N=48 and separated by $m_1 N$=48 chips. The time interval $T_c$ is the chip interval (for example, 1/1.2288 µseconds) and $\alpha$ is channel attenuation.

Referring again to FIG. 6, the gain $g_1$ may be chosen such that $$\sin(2\pi m_1 N \Delta fT_c) - g_1 \Delta f \cos(2\pi m_1 N \Delta fT_c) \approx 0.$$ (Equation 9)

Using the approximations $\sin(2\pi m_1 N \Delta fT_c) \approx 2\pi m_1 N \Delta fT_c$, and $\cos(2\pi m_1 N \Delta fT_c) \approx 1$, $g_1$ is solved as $g_1 = 2\pi m_1 NT_c$. The gain $g_2$ controls the convergence speed of the loop.

The following conclusions are drawn from the frequency offset estimates using the VRL illustrated in FIG. 6:

(a) Different C/I values result in different convergence times. The loop takes a considerably longer time to converge at low C/I.

(b) Due to the approximation taken in setting the value for $g_1$, there is a bias on the estimated $\Delta f$ at high C/I. The bias would not be present if the gain $g_1$ could be set as the ideal value of $\tan(2\pi m_1 N\Delta fT_c)/\Delta f$. However, this is not realistic, as the offset frequency $\Delta f$ is not known.

(c) For the example illustrated in FIG. 4, the standard deviation of the estimated $\Delta f$ is about 250 Hz at C/I of 15 dB.

One feature provides a novel scheme that more accurately estimates the frequency offset $\Delta f$ at high C/I values. Dividing the CPD output by the DPD output gives the following function of $\Delta f$:

$$D(\Delta f) = \tan(2\pi m_1 N\Delta fT_c) + \text{noise}.$$

In acquisition mode, for example, the function $D(\Delta f)$ can be approximated by a straight line for the range of $\Delta f$ that is of interest, i.e. $D(\Delta f) \approx k\Delta f$, where the slope k can be chosen as $k = \tan(2\Delta f_{max}\pi m_1 NT_c)/\Delta f_{max}$, where $\Delta f_{max}$ is the maximum anticipated frequency offset. In one implementation, this maximum frequency offset $\Delta f_{max}$ may be estimated by $(f_c \times v)/c$, where $f_c$ is the carrier frequency, v is the maximum speed of travel (e.g., aircraft speed) of a communication device relative to its communicating base station, and c is the speed of light. Therefore, $\Delta f$ can be estimated as $$\Delta \hat{f} = \frac{\Delta f_{max}}{\tan(2\Delta f_{max}\pi m_1 NT_c)} \times \frac{CPD}{DPD} = \frac{1}{k} \times \frac{CPD}{DPD} \qquad \text{(Equation 10)}$$

Figure 12:
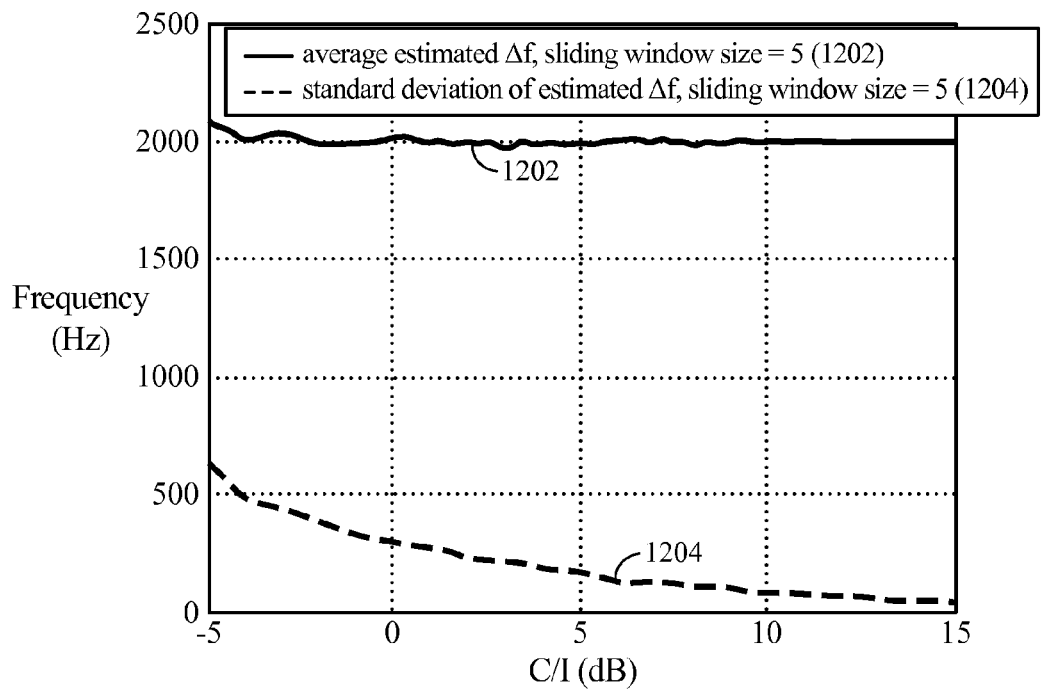
FIGS. 12 and 13 illustrate graphs of simulation results of estimated frequency offsets for a true frequency offset $\Delta f$ of 2000 Hz and −100 Hz, respectively.
Figure 13:
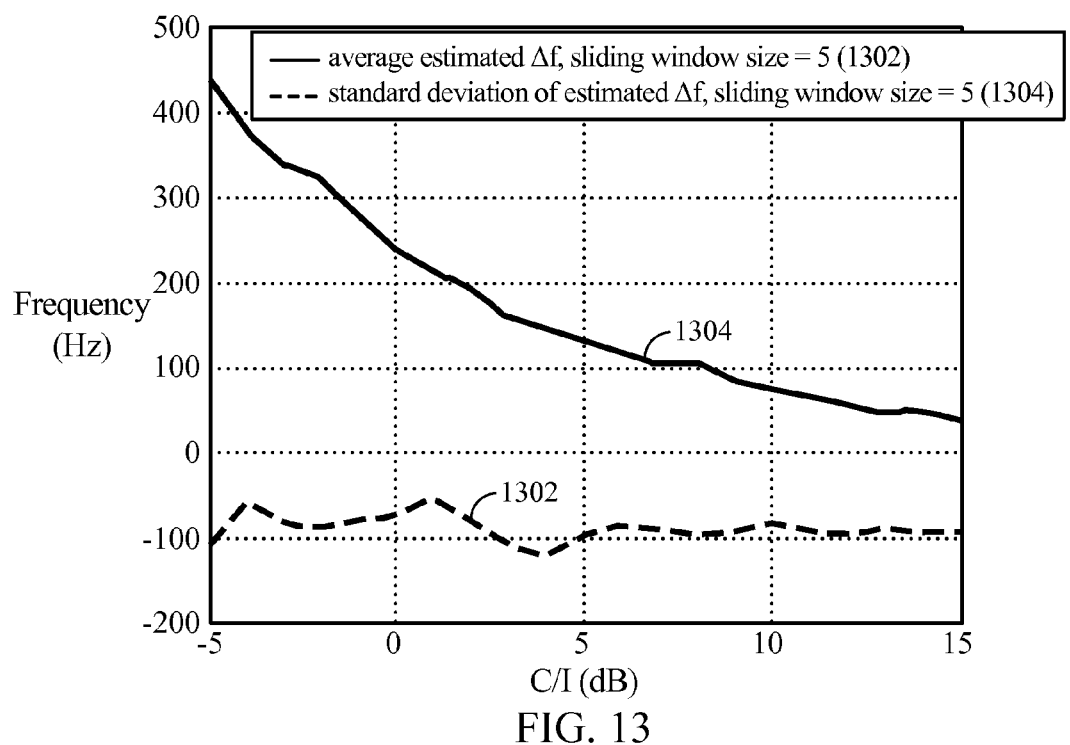

Moreover, the CPD term and the DPD term in Equation 10 can be obtained by averaging the CPD and the DPD output from each half-slot over a sliding window. FIGS. 12 and 13 illustrate graphs of simulation results of estimated frequency offsets for a true frequency offset $\Delta f$ of 2000 Hz and –100 Hz, respectively. The sliding window size is 5 half-slots in both of the simulations. The average is obtained over 1000 simulations. It can be seen the standard deviations 1204 and 1304 of the estimated frequency offsets $\Delta f$ is about 60 Hz at C/I of 15 dB (FIG. 13).

Figure 14:
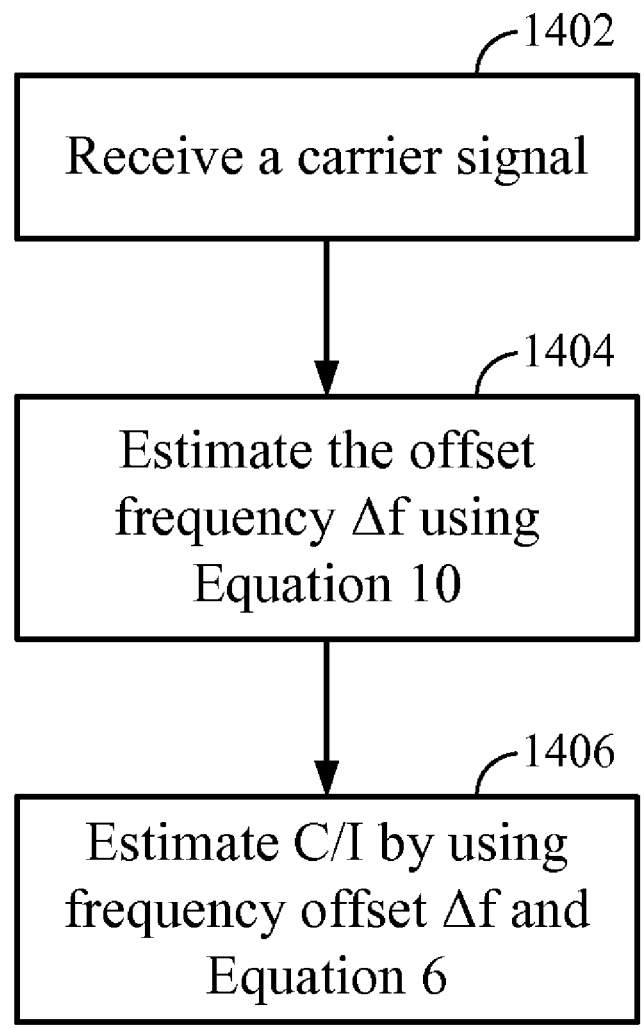
FIG. 14 illustrates a general method or algorithm for estimating C/I with a frequency offset $\Delta f$.

FIG. 14 illustrates a general method or algorithm for estimating C/I with a frequency offset $\Delta f$. First, a carrier signal is received 1402. Then, the frequency offset $\Delta f$ for the carrier signal is estimated by determining CPD and DPD, as described above, and applying Equation 10 above 1404. Lastly, C/I is estimated by applying Equation 6 and using the estimated frequency offset $\Delta f$ 1406.

Figure 15:
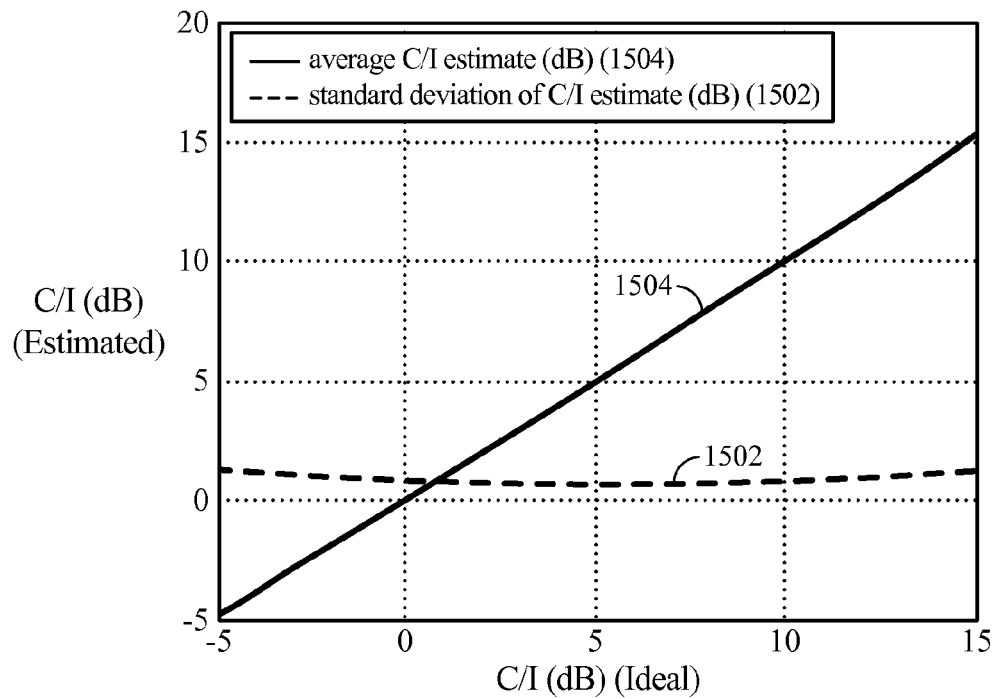
FIGS. 15 and 16 illustrate graphs of simulation results for estimated C/I in the presence of a frequency offset of 2000 Hz and −100 Hz.
Figure 16:
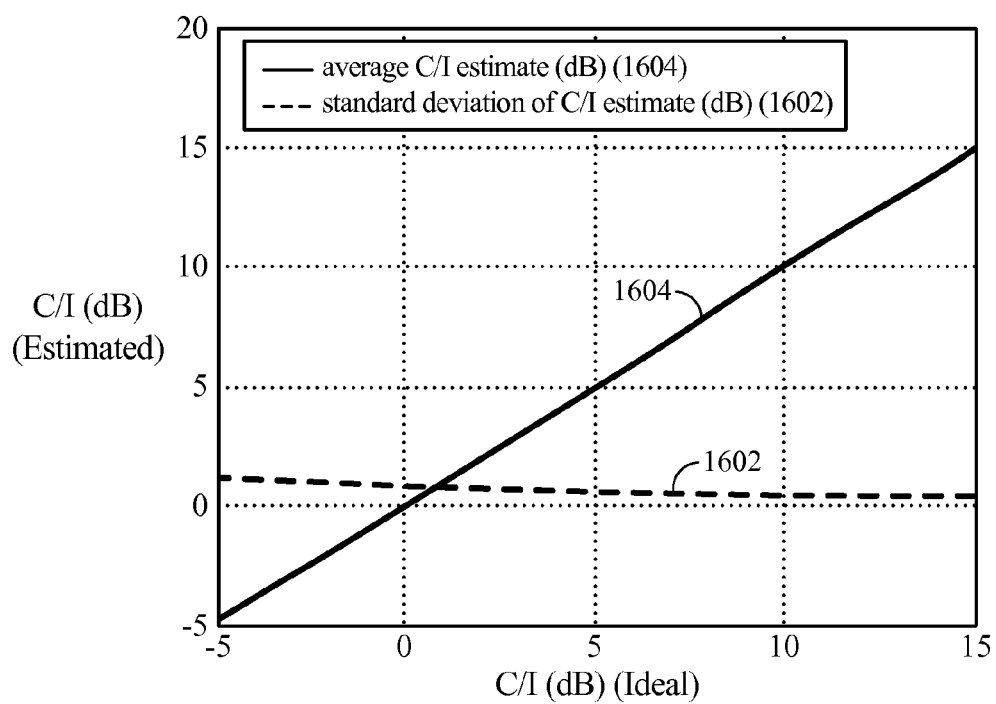

FIGS. 15 and 16 illustrate simulation results for estimated C/I in the presence of a frequency offset of 2000 Hz (1504 in FIG. 15) and –100 Hz (1604 in FIG. 16). The size of the sliding window for the frequency offset estimate is 5 half-slots. The average C/I is determined over 1000 simulations. Comparing FIGS. 15 and 16, it can seen that the performance of the algorithm is comparable to the performance if the receiver knew the true frequency offset $\Delta f$ and uses the true value to compensate the C/I estimate (FIG. 5). Moreover, the overall performance (lines 1504 and 1604) merely shows a marginal degradation (lines 1502 and 1602) in comparison with the result of a system without a frequency offset (shown in FIG. 3).

The automated frequency compensation system described herein may also be implemented in a digital signal processor (DSP) by implementing Equation 6. In one embodiment of the invention, the DSP may include a lookup table with predetermined frequency offset correction values that can be employed to compensate C/I for Doppler shift at various values of $\Delta f$. In particular, the lookup table may include the correction term $$\left| \sum_{k=0}^{K-1} e^{j2\pi k \Delta fT_c} \right|^2$$

which is used in Equation 6 to correct C/I.

Figure 17:
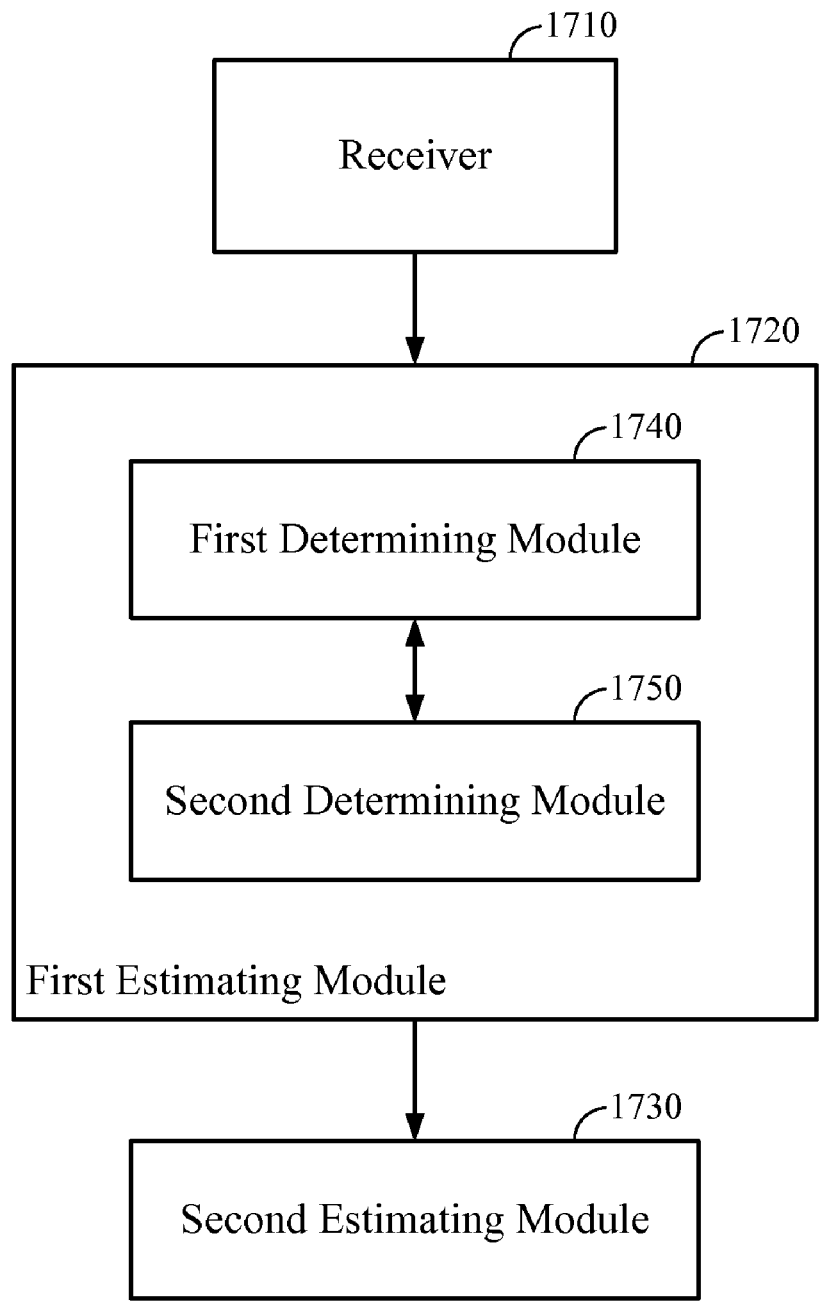
FIG. 17 illustrates an example implementation of a communication device.

FIG. 17 illustrates an example apparatus for use in frequency compensation as described above, comprising a receiver 1710, a first estimating module 1720 and a second estimating module 1730. Receiver 1710 is configured to receive a wireless carrier signal. First estimating module 1720 is configured to estimate a frequency offset for the carrier signal. Second estimating module 1730 is configured to estimate a received carrier signal power to interference signal power ratio (C/I) by using the frequency offset to compensate for Doppler shift between a receiver of the wireless carrier signal and a transmitter of the wireless carrier signal. To estimate the frequency offset, first estimating module 1720 may also comprise a first determining module 1740 configured to determine a cross product discriminator of the wireless carrier signal and a second determining module 1750 configured to determine a dot product discriminator of the wireless carrier signal.

It should be noted that the apparatus of FIG. 17 is an example and, as such, may comprise additional elements. In addition, first and second determining modules 1740 and 1750 may be implemented together without affecting the operation of the elements. Similarly, first and second estimating module 1720 and 1730 may be implementing together without affecting the operations of the elements. Moreover, one or more elements of FIG. 17 may be implemented together and/or rearranged and still achieve frequency compensation as described above.

Accordingly, it should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A wireless communication device comprising:
   an input interface coupled to an antenna to receive a wireless signal; and
   a signal processor configured to
      receive the wireless signal from the input interface,
      estimate a frequency offset for the received wireless signal, wherein the frequency offset is estimated by a ratio of a cross product discriminator and a dot product discriminator of a pilot burst in the wireless signal, and
      determine a received carrier signal power to interference signal power ratio (C/I) by using the frequency offset to compensate for Doppler shift.

2. The wireless communication device of 1 further comprising:
   a memory device coupled to the signal processor to store a lookup table of predetermined frequency offset correction values to determine the C/I.

3. The wireless communication device of 1 wherein the offset frequency is estimated by a ratio of the cross product discriminator and dot product discriminator of a pilot burst in the wireless signal.

4. The wireless communication device of 1 wherein the frequency offset is a factor of the maximum frequency offset $\Delta f_{max}$, estimated by $\Delta f_{max} \approx (f_c \times v)/c$, where $f_c$ is the carrier frequency, v is the maximum speed difference between a receiver of the carrier signal and a transmitter of the carrier signal, and c is the speed of light.

5. The wireless communication device of 1 wherein the wireless signal originates with a candidate base station.

6. The wireless communication device of 1 wherein the signal processor is further configured to
select the candidate base station from a plurality of candidate base stations based at least in part on their corresponding C/I.

7. The wireless communication device of 1 wherein the signal processor is further configured to
establish a communication link with the selected candidate base station.

8. A wireless communication device comprising:
means for receiving a wireless carrier signal;
means for estimating a frequency offset for the carrier signal, wherein the frequency offset is estimated by a ratio of a cross product discriminator and a dot product discriminator of a pilot burst in the wireless signal; and
means for estimating a received carrier signal power to interference signal power ratio (C/I) by using the frequency offset to compensate for Doppler shift between a receiver of the wireless carrier signal and a transmitter of the wireless carrier signal.

9. A frequency compensation method comprising:
receiving a wireless carrier signal;
determining a cross product discriminator of the wireless carrier signal; and
determining a dot product discriminator of the wireless carrier signal;
estimating a frequency offset for the carrier signal using the cross product and discriminator and the dot product discriminator;
estimating a received carrier signal power to interference signal power ratio (C/I) by using the frequency offset to compensate for Doppler shift between a receiver of the wireless carrier signal and a transmitter of the wireless carrier signal.

10. The method of 9 wherein the wireless carrier signal is a pilot signal from a candidate base station.

11. The method of 9 wherein estimating the frequency offset includes
determining a cross product discriminator of the wireless carrier signal, and
determining a dot product discriminator of the wireless carrier signal.

12. The method of 9 wherein the frequency offset estimate is determined by a ratio of the cross product discriminator and the dot product discriminator of a pilot burst in the wireless signal.

13. The method of 9 wherein the frequency offset is a factor of the maximum frequency offset $\Delta f_{max}$, estimated by $\Delta f_{max} \approx (f_c \times v)/c$, where $f_c$ is the carrier frequency, v is the maximum speed difference between a receiver of the carrier signal and a transmitter of the carrier signal, and c is the speed of light.

14. A processor comprising:
an input interface to couple an antenna and receive a carrier signal;
a circuit coupled to the input interface to receive the carrier signal and configured to
estimate a frequency offset for the carrier signal,
determine a carrier signal power to interference signal power ratio (C/I) by using the frequency offset to compensate for Doppler shift, and
estimate the frequency offset by a ratio of a cross product discriminator and a dot product discriminator of a pilot burst in the wireless signal as a factor of the maximum frequency offset $\Delta f_{max}$, estimated by $\Delta f_{max} \approx (f_c \times v/c$, where $f_c$ is the carrier frequency, v is the maximum speed difference between a receiver of the carrier signal and a transmitter of the carrier signal, and c is the speed of light.

15. The processor of 14 wherein the carrier signal is a pilot signal from a candidate base station and there is a relative motion between a receiver of the pilot signal and the candidate base station.

16. The processor of 14 wherein the circuit is further configured to estimate the frequency offset by a ratio of the cross product discriminator and dot product discriminator of a pilot burst in the wireless signal a factor of the maximum frequency offset $\Delta f_{max}$, estimated by $\Delta f_{max} \approx (f_c \times v)/c$, where $f_c$ is the carrier frequency, v is the maximum speed difference between a receiver of the carrier signal and a transmitter of the carrier signal, and c is the speed of light.

17. The processor of 14 wherein the circuit is further configured to retrieve a pre-calculated offset value from a look-up table to determine the C/I.

18. The processor of 14 wherein the circuit is further configured
search for candidate base stations; and
switch from a current base station to a candidate base station, if a better communication link can be established with the candidate base station than is available with the current base station.

19. A machine-readable medium storing one or more instructions for compensating for a frequency offset when a receiver selects between candidate base stations, which when executed by a processor causes the processor to:
receive one or more pilot signals from one or more candidate base stations;
estimate a frequency offset for the one or more pilot signals, wherein the frequency offset is estimated by a ratio of a cross product discriminator and a dot product discriminator of a pilot burst in the wireless signal; and
estimate a received carrier signal power to interference signal power ratio (C/I) by using the frequency offset to compensate for Doppler shift between the receiver and the one or more candidate base stations.

20. The machine-readable medium of 19 further having one or more instructions which when executed by a processor causes the processor to:
select the candidate base station from the one or more candidate base stations based on their corresponding the C/I; and
switch from a current base station to a candidate base station, if a better communication link can be established with the candidate base station than is available with the current base station.

* * * * *